United States Patent [19]

Roe

[11] Patent Number: 4,736,419

[45] Date of Patent: Apr. 5, 1988

[54] ELECTRONIC LOCK SYSTEM

[75] Inventor: Bruce C. Roe, Aurora, Ill.

[73] Assignee: American Telephone and Telegraph Company, AT&T Bell Laboratories, Murray Hill, N.J.

[21] Appl. No.: 685,833

[22] Filed: Dec. 24, 1984

[51] Int. Cl.⁴ .................. H04L 9/00

[52] U.S. Cl. .................. 380/3; 380/23; 380/28; 235/382.5

[58] Field of Search .................. 340/542, 825.34; 178/22.08, 22.09; 235/379, 380, 382, 382.5; 380/23, 24, 28, 25, 3

[56] References Cited

U.S. PATENT DOCUMENTS

| | | | |
|---|---|---|---|
| Re. 29,259 | 6/1977 | Sabsay | 235/382.5 |
| 3,906,460 | 9/1975 | Halpern | 178/22.08 |
| 4,079,356 | 3/1978 | Anagnost et al. | 340/542 |
| 4,262,284 | 4/1981 | Stieff et al. | 340/542 |
| 4,283,710 | 8/1981 | Genest et al. | 235/382.5 |
| 4,286,305 | 8/1981 | Pilat et al. | 361/172 |
| 4,471,216 | 9/1984 | Herve | 235/379 |
| 4,498,000 | 2/1985 | Decavele et al. | 235/381.5 |
| 4,509,092 | 4/1985 | Invernizzi | 340/542 |
| 4,558,175 | 12/1985 | Genest et al. | 178/22.08 |

OTHER PUBLICATIONS

"Keyed-access Erasable Programmable ROM Prevents Unauthorized System Access", *EDN*, Mar. 21, 1985, pp. 131-132.

"Identity-authentication System Prevents Unauthorized Computer Access", *EDN*, Apr. 11, 1985, p. 151.

*Primary Examiner*—Salvatore Cangialosi
*Assistant Examiner*—Aaron J. Lewis
*Attorney, Agent, or Firm*—Richard J. Godlewski

[57] ABSTRACT

An electronic lock system having a data encryption key physically and electronically protected from identification for protecting electronic equipment from use by unauthorized personnel. The lock system includes two keys circuits that implement a data encryption key and algorithm for encrypting random data. The data encryption key and algorithm are physically protected from physical identification by encapsulating the implementation in an integrated circuit. The second key circuit identical to the first is included in a lock circuit for generating two output signals. One output signal represents an unlocked condition of the system, whereas the other represents the lock condition. A random data signal is applied to the two key circuits for encryption under the data encryption key and algorithm. The lock circuit further includes a match circuit which generates the unlocked condition output signal when the encrypted data from the two key circuits matches for a predetermined period of time. Otherwise, the match circuit generates the locked condition output signal.

19 Claims, 3 Drawing Sheets

ELECTRONIC LOCK SYSTEM

TECHNICAL FIELD

This invention relates generally to electronic lock systems and, more particularly, to an electronic lock system implementing a data encryption key protected from physical identification and a data encryption algorithm under the control of the data encryption key for encrypting data to electronically protect the identity of the data encryption key.

BACKGROUND OF THE INVENTION

A number of prior art electronic lock systems employ electrical or mechanical keys having a specific identification code. The identification code of a mechanical key such as the grooves and teeth cut on a metal insert to open a mechanical lock is physically identifiable and easily duplicated for use by unauthorized personnel. Similarly, the identification code of an electrical key such as a binary code stored on a magnetic tape strip which is affixed to a plastic card is easily identified and duplicated by electronic means.

SUMMARY OF THE INVENTION

The foregoing problem of physically and electronically protecting the identification of a key in an electronic lock system are solved and a technical advance is achieved in an illustrative electronic lock system including a key circuit that implements an encryption key and an encryption algorithm under the control of the key for encrypting data. The key circuit is protected from physical identification by, for example, implementing the encryption key and algorithm in an encapsulated integrated circuit. The use of an encryption key and an algorithm makes electronic identification of the encryption key difficult. The electronic lock system also includes a lock circuit that includes another key circuit implementing the same encryption key and algorithm. The lock circuit generates an output signal indicative of an unlocked condition when the encrypted data from the two key circuits matches for a predetermined period of time.

In accordance with one feature of this invention, the lock circuit further includes a random number generator for generating random data for the two key circuits. This makes electronic identification of the data encryption key and algorithm even more difficult.

In accordance with another feature of this invention, the lock circuit includes a match circuit for generating the "unlocked condition" output signal when the encrypted data from the two key circuits has matched for a predetermined period of time.

In accordance with still another feature, the match circuit includes a match detector for generating a match signal when the encrypted data from the two key circuits matches and a mismatch signal when the encrypted data mismatches. The match circuit also includes a match counter for generating the "unlocked condition" output signal when the encrypted data from the two key circuits matches for the predetermined period of time. Otherwise, the match counter generates another output signal indicative of the locked condition of the system when the encrypted data from the two key circuits mismatches.

In accordance with yet another feature, the lock circuit includes a unidirectional buffer to restrict electronic tampering by preventing external signals from being applied to the key circuit included in the lock circuit.

BRIEF DESCRIPTION OF THE DRAWING

The invention may be better understood from the following detailed description when read with reference to the drawing in which.

DETAILED DESCRIPTION

Figure 1:
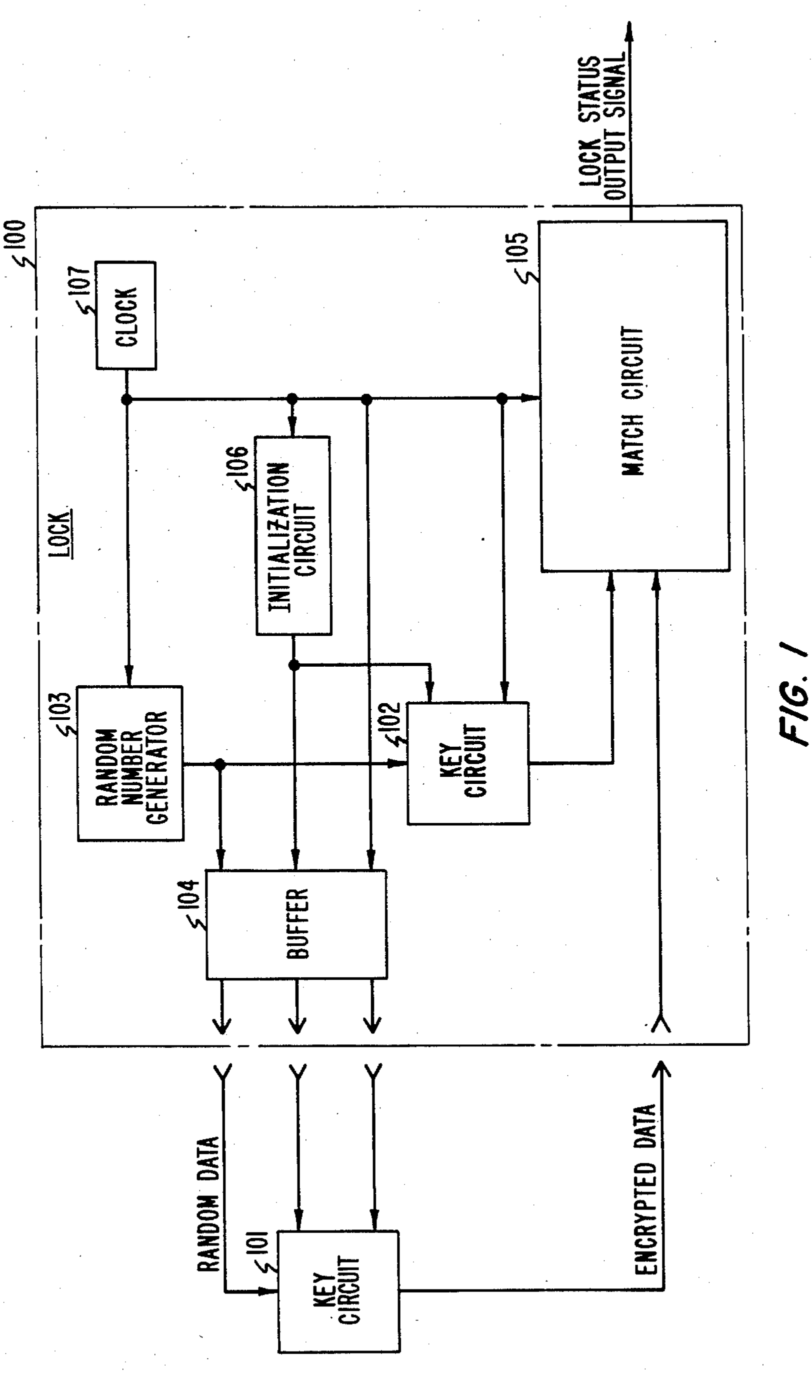
FIG. 1 depicts a block diagram of an illustrative electronic lock system for physically and electronically protecting electronic equipment from use by unauthorized personnel.

Depicted in FIG. 1 is a block diagram of an illustrative electronic lock system comprising lock circuit 100 and key circuit 101 that have identical data encryption keys for protecting electronic equipment such as a computer data terminal from use by unauthorized personnel. This electronic lock system may also be used as part of a security system to protect buildings, vehicles, and the like. In addition, this lock system may be used in video game hardware, personal computers, and the like to prevent use of copied or "pirated" software programs. The data encryption key, which is also referred to as an identification code, is a binary number that is used by a data encryption algorithm to encrypt data. Included in lock circuit 100 is key circuit 102 that is identical to key circuit 101. Key circuit 102 also implements a data encryption key that is identical to the one implemented by key circuit 101. Each of key circuits 101 and 102 also implements a data encryption algorithm for encrypting data under the control of the data encryption key. A data encryption algorithm suitable for use in this illustrative embodiment of the invention is described in Federal Information Processing Standards Publication 46, Jan. 15, 1977, entitled "Data Encryption Standard." To protect the data encryption algorithm and key from physical identification, each of key circuits 101 and 102 is implemented in a separate integrated circuit.

Key circuit 101 is mounted on a suitable carrier such as a plastic card for use by authorized personnel. The plastic card with key circuit 101 may then be inserted into a suitable connector for electrical connection with lock circuit 100. A number of key circuits 101 can be initially fabricated in individual integrated circuits for use by authorized personnel. However, for added security, the data encryption key should not be retained for subsequent duplication.

Also included in lock circuit 100 and implemented with key circuit 102 in one integrated circuit are random number generator 103, unidirectional buffer circuit 104, match circuit 105, initialization circuit 106, and clock circuit 107. Implementing the entire lock circuit on one integrated circuit prevents physical identification of the lock circuit without physically destroying the lock circuit. When key circuit 101 is connected to lock circuit 100, random number generator 103 generates random data for key circuits 101 and 102. Under the control of the data encryption key, key circuits 101 and 102 encrypt the random data from random number generator 103. When the data encryption key and algorithm of key circuits 101 and 102 are identical, the encrypted data from the two key circuits that is applied to match circuit 105 is likewise identical. Match circuits 105 compares the encrypted data from the two key circuits and generates an output signal indicative of a unlocked condition of the lock circuit when the encrypted data from the two key circuits matches for a predetermined period of time. When the encrypted data from the two key circuits does not match, the lock circuit generates another output signal indicative of a locked condition of the lock circuit.

Clock 107 provides timing signals for key circuit 101 and the other circuits of lock 100. Initialization circuit 106 in response to timing signals from clock 107 periodically initializes key circuits 101 and 102. Unidirectional buffer 104 sends the random data, clock, and initialization signals to key circuit 101 and prevents data, clock, and initialization signals from external sources from being applied to the other circuits of lock 100. This is to prevent electronic tampering of the lock circuit from unauthorized users.

Figure 2:
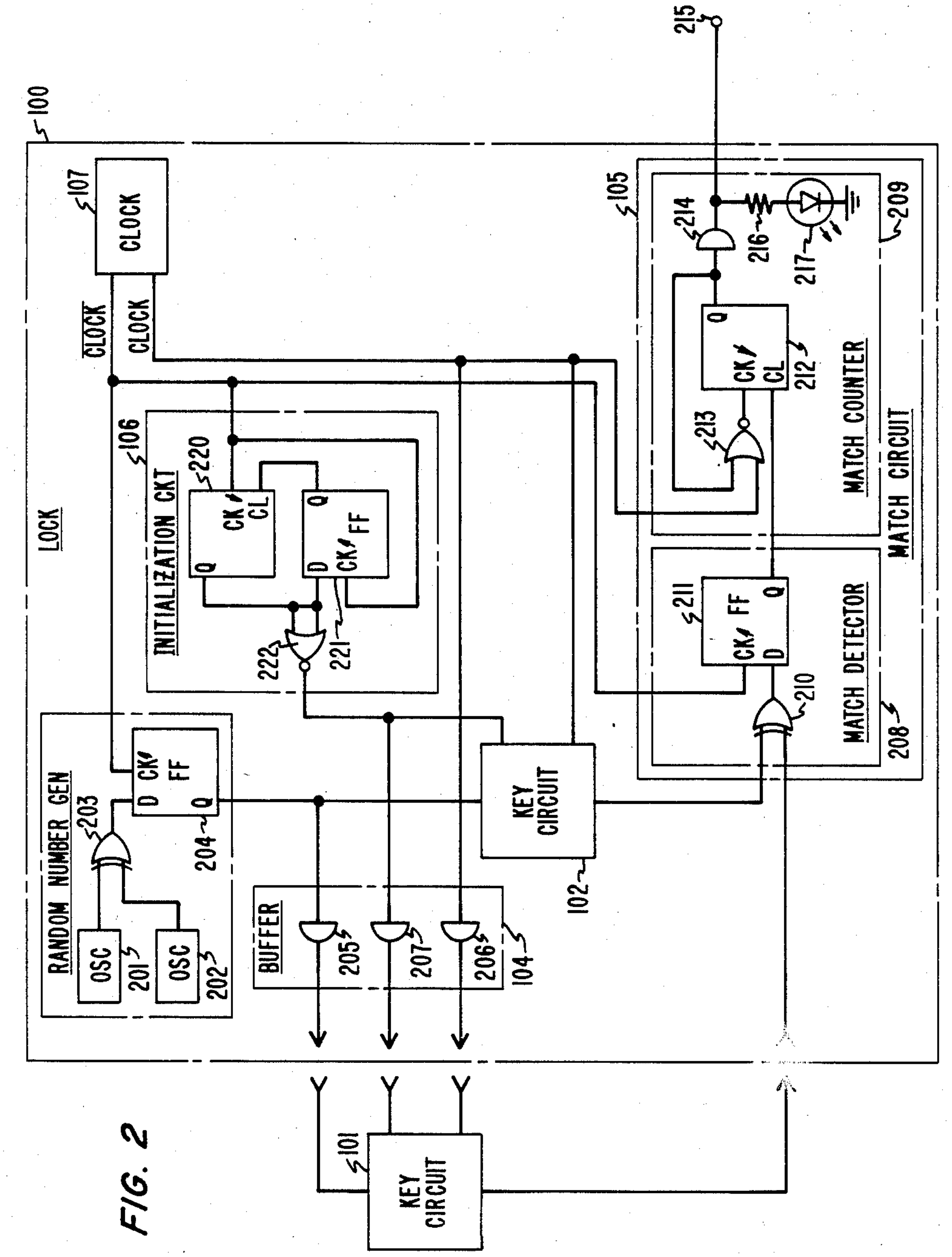
FIG. 2 shows a detailed block diagram of the electronic lock system of FIG. 1.

Depicted in FIG. 2 is a detailed block diagram of lock circuit 100. All the circuits of lock 100 are well-known and commercially available circuits. However, for security, all the circuits of lock 100 should be implemented with the protected electronic equipment in a single integrated circuit. Random number generator 103 comprises oscillators 201 and 202, comparator 203, and latch 204 for generating random data for key circuits 101 and 102. Oscillator circuit 201 generates one binary signal with a fixed bit rate such as 7.5 Kbps that is applied to one input terminal of EXCLUSIVE OR logic gate comparator 203. Similarly, oscillator 202 generates another binary signal with a second fixed bit-rate such as 9.3 Kbps that is applied to the other input terminal of comparator 203. The bit-rates of oscillator circuits 201 and 202 are selected to be different and not an integer multiple of each other. In response to the two different bit-rate binary signals of oscillators 201 and 202, comparator 203 generates an irregularly varying binary signal that is applied to the D input terminal of D-type flip-flop latch 204. The latch is clocked at a frequency different from the bit-rates of oscillators 201 and 202 such as 8.4 KHz to generate random data on the Q output terminal of the latch.

Clock circuit 107 comprises another oscillator circuit for generating a pair of complementary binary clock signals at a fixed bit-rate that is different from the bit-rates of oscillators 201 and 202. The rising edge of the binary complement clock signal that is applied to the CK terminal of latch 204 causes the irregularly varying binary signal from comparator 203 to be periodically latched into latch 204. As a result, the output signal on the Q output terminal of latch 204 is random data.

The random data from random number generator 103 along with a binary clock and an initialization signal are applied to key circuit 101 through unidirectional buffer circuit 104 and directly to key circuit 102. Buffer circuit 104 comprises unidirectional buffers 205 through 207. Unidirectional buffer 205 applies the random data to key circuit 101 and electrically prevents any signals from being externally applied to key circuit 102. In a similar manner, unidirectional buffer circuits 206 and 207 apply the binary clock and initialization signals to key circuit 101 and electrically protect key circuit 102 from externally applied clock and initialization signals.

When key circuit 101 is connected to lock circuit 100, key circuits 101 and 102 with identical data encryption algorithms and keys encrypt the random data in an identical manner and apply the two encrypted random data signals to match circuit 105.

The two encrypted data signals are compared by match circuit 105 for coincidence over a predetermined period of time. When the two encrypted data signals match for a predetermined period of time, the match circuit generates a first output signal indicative of a unlocked condition. This first output signal may then be used to control the use of other electronic equipment such as a computer data terminal for use by authorized personnel. When the encrypted data from the two key circuits does not match indicating unauthorized use, match circuit 105 generates a second output signal indicative of a locked condition thereby preventing unauthorized use of the subtending electronic equipment.

Match circuit 105 comprises match detector 208 and match counter 209. Match detector 208 generates a clocked first match signal for match counter 209 in response to the binary complement clock signal from clock 107 and the matching encrypted random data from the two key circuits. The match detector also generates a clocked first mismatch signal when the two encrypted data signals have different logic levels. Match detector 208 comprises EXCLUSIVE OR logic gate comparator 210 and D-type flip-flop latch 211. Comparator 210 generates a second match signal when the two encrypted data signals have identical logic levels and a second mismatch signal when the input logic levels are different. These signals are applied to the D input terminal of latch 211 and are clocked out on the Q output terminal as clocked first match and mismatch signals for match counter 209. The signals are clocked out of the latch in response to the rising edge of the binary complement clock signal from clock 107 being applied to the CK terminal of the latch.

Match counter 209 generates the first output signal indicative of a unlocked condition in response to the clocked match signal from match detector 208 and the binary clock signal from clock 107. This happens only after the clocked match signal has occurred for the designated predetermined period of time. Otherwise, the match counter generates the second output signal indicative of a locked condition. Match counter 209 comprises counter 212, feedback logic NOR gate 213, and power buffer 214 interconnected as shown in a well-known manner. Counter 212 is responsive to a clocked feedback signal from feedback logic NOR gate 213 and a clocked match signal from match detector 208 to increment a count contained in the counter. On the falling edge of each clock feedback signal pulse applied to the CK terminal of the counter, the count is incremented as long as a clocked match signal is received from match detector 208. Depending on the bit-rate of the clock signal, the count in counter 212 is allowed to reach a maximum count indicative of a predetermined period of time. When the count in counter 212 reaches this maximum count, the first output signal indicative of an unlocked condition is generated on the Q output terminal and applied to power buffer 214. Otherwise, the "locked condition" output signal is generated. Power buffer 214 applies the output signal to output terminal 215 and the series combination of load resistor 216 and light emitting diode 217 that visually indicates the locked and unlocked condition of the lock circuit. The signal on the Q output terminal of counter 212 is also applied to feedback logic NOR gate 213 to enable the gate to apply clock signals to counter 212. When the count in the counter is less than the maximum count, the output signal is indicative of a locked condition, but allows the counter to reach the maximum count when a clocked match signal from match detector 208 is applied to the match counter. When a clocked mismatch signal is received from match detector 208, the count in counter 212 is initialized and a locked condition output signal is applied to output terminal 215.

Also included in lock circuit 100 is initialization circuit 106 for initializing key circuits 101 and 102 in response to the binary complement clock signal from clock circuit 107. Initialization circuit 106 comprises counter 220, D-type flip-flop latch 221, and NOR gate 222 interconnected as shown to periodically generate an initialization signal to key circuits 101 and 102. A count in counter 220 is incremented by each pulse of the clock signal until a maximum count is reached. When the maximum count is reached, the leading edge of an initialization signal pulse is applied to both input terminals of logic NOR gate 222 and key circuits 101 and 102. This changing logic level signal also causes the logic level stored in latch 221 to change when the rising edge of the binary complement clock signal is applied to the CK latch input terminal. A low logic level signal on the Q output terminal of the latch is then fedback to the CL input terminal of counter 220 to initialize the count therein. The binary complement clock and initialization signals are applied to key circuit 101 via unidirectional buffers 206 and 207, respectively.

Figure 3:
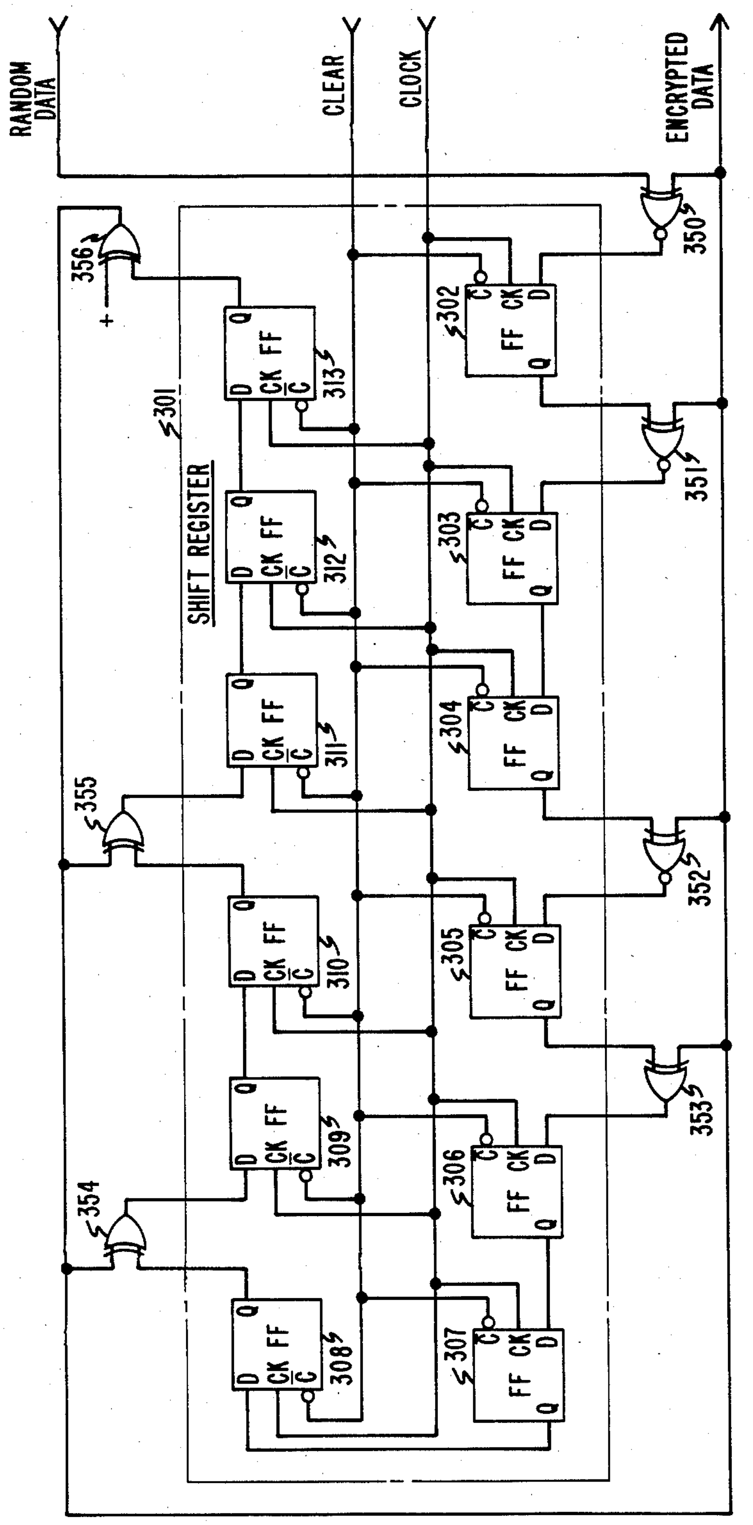
FIG. 3 shows a detailed block diagram of the key circuits of the electronic lock system of FIG. 1.

Depicted in FIG. 3 is a detailed block diagram of key circuits 101 and 102 implementing an illustrative data encryption algorithm and key. For example, the data encryption algorithm may be data encryption standard (DES) algorithm described in Federal Information Processing Standards Publication 46, Jan. 15, 1977. The key associated with the DES algorithm consists of 64 binary digits of which 56 bits are used directly by the algorithm and 8 bits for error detection. The DES algorithm is designed to encrypt blocks of data consisting of 64 bits under the control of 64-bit key. The data encryption key and algorithm of this illustrative embodiment are implemented in key circuits 101 and 102 by a 12 stage shift register 301 with selected stages of the shift register being interconnected as shown by selected logic gates 350–356. The Q output terminal of each of the remaining stages of the shift register is directly connected as shown to the D input terminal of the next shift register stage. Shift register comprises a plurality of D-type flip-flop latches 302 through 313. To initialize the shift register, the initialization signal is applied to the $\overline{C}$ terminal of each register stage. Similarly, the binary clock signal is applied to the CK terminal of each register stage. As shown in FIG. 3, the random data is first applied to the first shift register stage 302 via EXCLUSIVE NOR gate 350. The serial data is shifted from one stage to the next through the remaining logic gates 351–356 as shown in response to each clock signal pulse. The output of the last shift register stage 313 is returned to the lock circuit through logic gate 356 and fed back to logic gates 350–355 as shown. Although shown as only a 12-stage shift register, the shift register could be extended to include a full 64 bits as indicated by the DES algorithm and key. The data encryption key can be changed by varying the type and number of interconnecting logic gates between the shift register stages. To protect the data encryption key as well as the algorithm from physical identification, the key circuits as previously suggested may be included in an integrated circuit and then encapsulated. This will prevent physical identification of the key which for all practical purposes would be destroyed upon physical disassembly of the encapsulated integrated circuit.

It is to be understood that the above described electronic lock circuit is merely an illustrative embodiment of the principles of this invention and that numerous other arrangements may be devised by those skilled in the art without departing from the spirit and scope of the invention. In particular, one skilled in the art may easily use a different data encryption algorithm and key configuration in key circuits 101 and 102 as well as applying a predetermined set of input signals to the various keys.

What is claimed is:

1. An electronic lock system comprising:

a first key circuit implementing an encryption key and an encryption algorithm under the control of said encryption key for encrypting a plurality of random numbers from a lock circuit;

a second key circuit identical to said first key circuit and implementing said encryption key and said encryption algorithm for encrypting said random numbers, and said lock circuit responsive only to the encrypted random numbers from said first key circuit and including said second key circuit for generating an output signal representative of an unlocked condition when the encrypted random numbers from said first key circuit match the encrypted random numbers from said second key circuit for a predetermined period of time and also including a unidirectional buffer for preventing said second key circuit from receiving any signal externally applied to said lock circuit.

2. The system of claim 1 wherein said lock circuit is also responsive to the encrypted random numbers from said first key circuit for generating another output signal representative of a locked condition when the encrypted random numbers from said first key circuit mismatch the encrypted random numbers from said second key circuit.

3. The system of claim 1 wherein said lock circuit includes a generator circuit for generating said random numbers.

4. The system of claim 1 wherein said lock circuit further includes a counter circuit for measuring said predetermined period of time.

5. An electronic lock system comprising:

first key means implementing an encryption key and an encryption algorithm under the control of said encryption key for encrypting data from a lock means;

second key means identical to said first key means and implementing said encryption algorithm said encryption key for encrypting said data; and said lock means responsive only to the encrypted data from said first key means and including said second key means for generating a first output signal indicative of when the encrypted data from said first and second key means match for a predetermined period of time and also including a unidirectional buffer for preventing said second key circuit from receiving any signal externally applied to said lock circuit.

6. The system of claim 5 wherein said lock means is also for generating a second output signal indicative of when the encrypted data from said first and second key means mismatch.

7. The system of claim 5 wherein said system further comprises generator means for generating said data.

8. The system of claim 7 wherein said generator means comprises a first oscillator means for generating a first binary signal with a first bit-rate, a second oscillator means for generating a second binary signal with a second bit-rate, and comparator means responsive to said first and second binary signals for generating an irregularly varying binary signal.

9. The system of claim 8 in which said data is random with a third bit-rate, wherein said system further comprises clock means for generating a binary clock signal having said third bit-rate, and wherein said generator means further comprises latch means responsive to said binary clock signal and said irregularly varying binary signal for generating said random data.

10. The system of claim 9 wherein said lock means further comprises match means responsive to said clock signal and the encrypted data from said first and second key means for generating said first output signal with said third bit-rate when the encrypted data from said first and second key means match for said predetermined period of time.

11. The system of claim 10 wherein said match means comprises match detector means responsive to said clock signal for generating a first match signal with said third bit-rate when the encrypted data from said first key means match the encrypted data from said second key means and match counter means responsive to said first match signal and said clock signal for generating said first output signal when the encrypted data from said first and second key means match for said predetermined period of time.

12. The system of claim 11 wherein said detector means comprises comparator means for generating a second match signal when the encrypted data from said first key means match the data from said second key means and latch means responsive to said clock signal and said second match signal for generating said first match signal.

13. The system of claim 12 wherein said match counter means comprises feedback means responsive to said clock signal and said first output signal for generating a feedback signal and counter means responsive to said feedback signal and said match signal for generating said first output signal when the encrypted data from said first and second key means match for said predetermined period of time.

14. The system of claim 13 wherein said first key means comprises a first shift register having a plurality of stages and first logic means for interconnecting certain of the stages of said first shift register in a predetermined manner to implement said encryption algorithm and said encryption key.

15. The system of claim 14 wherein said second key means comprises a second shift register having a plurality of stages equivalent to said first shift register and second logic means equivalent to said first logic means for interconnecting certain of the stages of said second shift register in said predetermined manner to implement said encryption algorithm and said encryption key.

16. The system of claim 15 wherein said system further comprises initialization means responsive to and clock signal for initializing said first and second key means to a predetermined condition.

17. The system of claim 5 further comprising means for encapsulating said first key means for protecting said first key means from physical identification.

18. The system of claim 1 further comprising means for encapsulating said first key circuit for protecting said first key circuit from physical identification.

19. An electronic lock system comprising:

first key means having an encryption key and an encryption algorithm controlled by said encryption key and only responsive to random numbers, a first clock signal, and an initialization signal for encrypting said random numbers and including first register means having a plurality of stages responsive to said initialization signal and said first clock signal for implementing said encryption algorithm and further including first logic means interconnecting certain of said stages of said first register means in a predetermined manner for implementing said encryption key;

second key means identical to said first key means and having said encryption key and said encryption algorithm controlled by said encryption key and only responsive to said random numbers, said initialization signal, and said first clock signal for encrypting said random numbers and including second register means having a plurality of stages equivalent to said first register means and responsive to said initialization signal and said first clock signal for implementing said encryption algorithm and further including second logic means equivalent to said first logic means for interconnecting certain of said stages of said second register means in said predetermined manner for implementing said encryption key;

lock means for generating an output signal indicative of when the encrypted random numbers from said first and second key means match for a predetermined period of time, said lock means comprising:

clock means for generating said first clock signal and a second clock signal having a third bit-rate and being a complement of said first clock signal, generator means for generating said random numbers and including first oscillator means for generating a first binary signal with a first bit-rate, second oscillator means for generating a second binary signal with a second bit-rate, comparator means responsive to said first and second binary signals for generating an irregularly varying binary signal, and first latch means responsive to said second clock signal and said irregularly varying binary signal for generating said random numbers, match means responsive to said first and second clock signals and the encrypted random numbers from said first and second key means for generating said output signal with said third bit-rate when the encrypted random numbers from said first and second key means match for said predetermined period of time and including match detector means responsive to said second clock signal for generating a first match signal with said third bit-rate when the encrypted random numbers from said first key means match the encrypted random numbers from said second key means and having comparator means for generating a second match signal when the encrypted random numbers from said first and second key means match and also having latch means responsive to said second clock signal and said second match signal for generating said first match signal and also including match counter means responsive to said first match signal and said first clock signal for generating said output signal when the encrypted random numbers from said first and second key means match for said predetermined period of time and having feedback means responsive to said first clock signal and said output signal for generating a feedback signal and also having counter means responsive to said feedback signal for generating said output signal when the encrypted random numbers from said first and second key means match for said predetermined period of time, buffer means for isolating said second key means from any signal externally applied to said lock means and including first unidirectional buffer means for applying said random numbers to said first key means, second unidirectional buffer means for applying said initialization signal to said first key means, and third unidirectional buffer means for applying said first clock signal to said first key means, and initialization means for periodically generating said initialization signal for said first and second key means and including counter means responsive to said second clock signal for incrementing a count to a maximum count and responsive to a clear signal for initializing said count, logic means responsive to said maximum count for generating said initialization signal, and latch means responsive to said maximum count and said second clock signal for generating said clear signal;

encapsulated integrated circuit means for protecting said first key means from physical identification; and encapsulated integrated circuit means for protecting said lock means from physical identification.

* * * * *